Nov. 1, 1927. 1,647,590
T. B. TIEFENBACHER
BORING TOOL HOLDER
Filed March 13, 1925 2 Sheets-Sheet 1

INVENTOR
Thomas B. Tiefenbacher.
BY
Townsend+Decker
ATTORNEYS

Nov. 1, 1927.

T. B. TIEFENBACHER

BORING TOOL HOLDER

Filed March 13, 1925  2 Sheets-Sheet 2

1,647,590

INVENTOR
Thomas B. Tiefenbacher.
BY
Townsend & Decker
ATTORNEYS

Patented Nov. 1, 1927.

1,647,590

UNITED STATES PATENT OFFICE.

THOMAS B. TIEFENBACHER, OF ELIZABETH, NEW JERSEY.

BORING-TOOL HOLDER.

Application filed March 13, 1925. Serial No. 15,220.

This invention relates to tool-holders or posts for boring or other tools and has for its principal object the production of a device which shall be of simple construction and which shall permit the tool to be readily raised or lowered and still retain a perfectly horizontal position.

Further objects and advantages of the invention will be apparent from the accompanying description, the invention consisting in the novel tool-holder hereinafter more particularly described and then specified in the claims.

In the accompanying drawings illustrating a practical embodiment of the invention:

Figure 1:
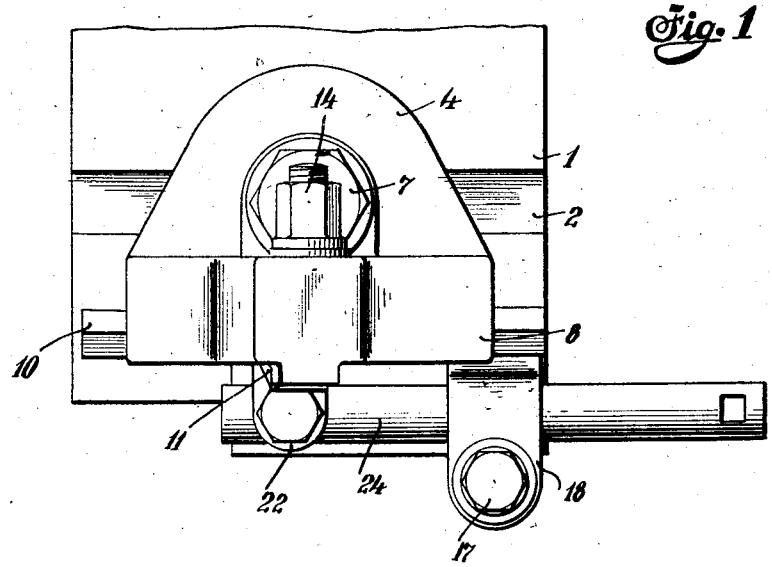
Fig. 1 is a top plan view of the device.
Figure 2:
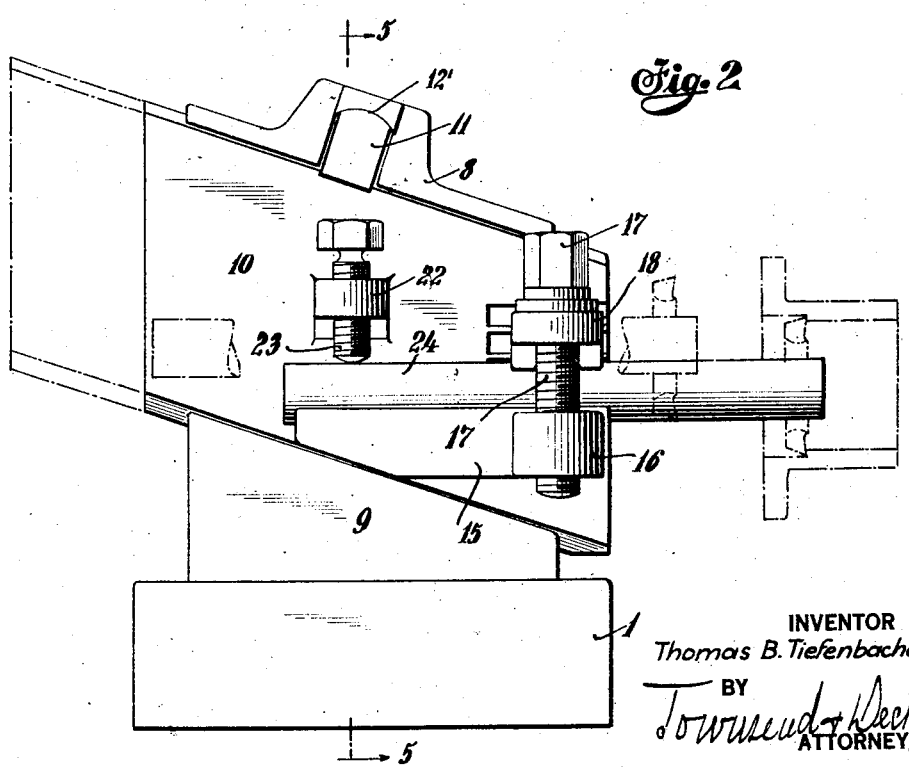
Fig. 2 is a side elevation thereof showing the tool in a different position in dotted lines.
Figure 3:
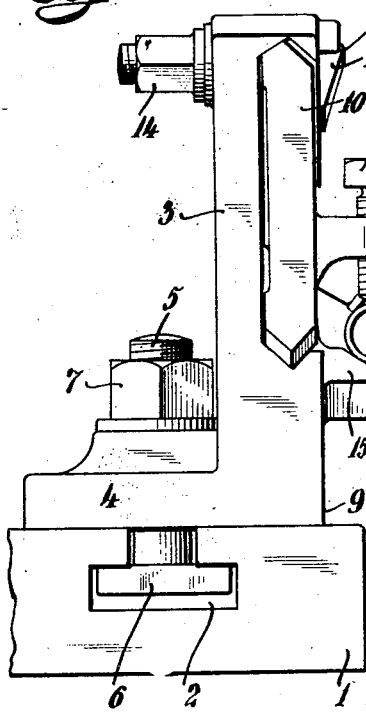
Fig. 3 is a side elevation of one side of the device.
Figure 4:
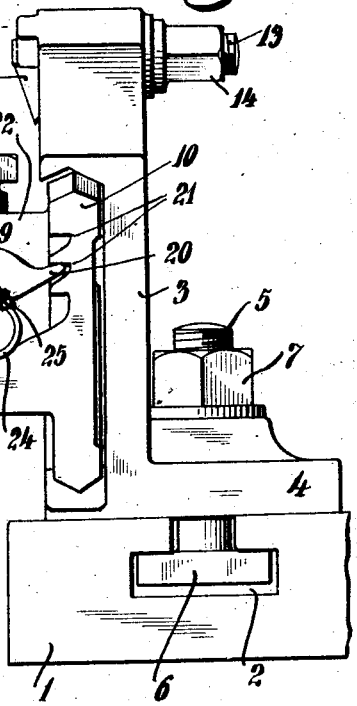
Fig. 4 is a side elevation of the other side.
Figure 5:
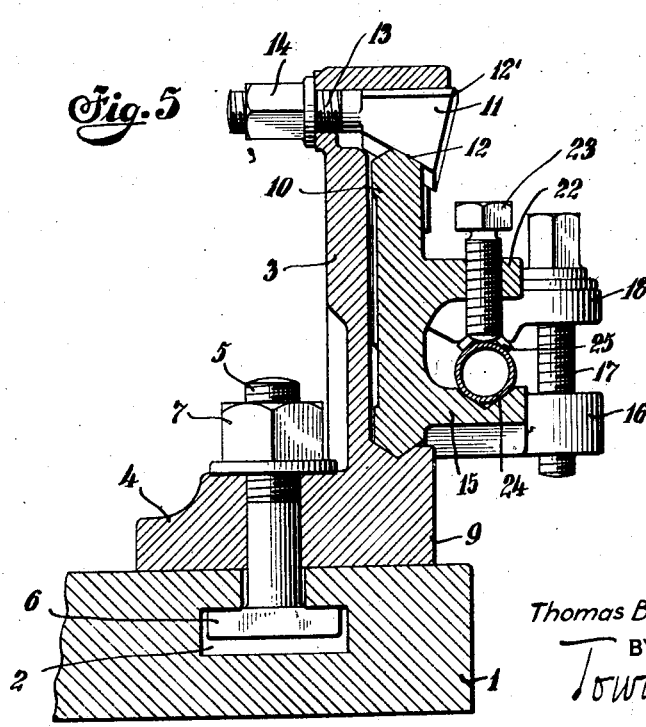
Fig. 5 is a vertical cross-section on the line 5—5 of Fig. 2.

Referring to the drawings:

1 indicates a carriage which is slotted as at 2 and which supports a post 3 having a flange 4 through which a bolt 5 extends, said bolt having a head 6 slidable in the slot 2 whereby the relative position of the post with respect to the carriage may be changed. The post may be clamped and held in position by means of the nut 7 on the end of the bolt.

The post 3 is provided with upper and lower inclined members 8 and 9 respectively which are provided with V-shaped grooves as illustrated to form an inclined seat or support for an inclined slidable plate 10 the upper and lower edges of which are so shaped as to slidably interfit with said grooves. For holding the plate in any desired position of adjustment I provide a wedge 11 having a lower inclined face 12, an upper rounded wall 12′ and a screw-threaded shank 13 which extends through an opening in the post. The end of the shank 13 receives a nut 14 which, when tightened, obviously acts to force the inclined face 12 of the wedge tightly against the upper edge of the plate 10 whereby said plate will be jammed against the rear side of the V-shaped groove of the upper member 8, thereby preventing movement of said plate.

Fastened to the lower portion of the plate 10 is a grooved tool support 15 which may be an integral part of said plate if so desired. Said tool support is provided with a screw-threaded ear 16 receiving the shank of a screw-threaded bolt 17, said shank also passing through a slot in a removable clamp 18 which is provided with a groove 19 and a lip 20.

The plate 10 is also provided with a series of notches 21 adapted to receive the lip 20 of the clamp 18 and it also carries a screw-threaded ear 22 receiving a screw-threaded bolt 23. The boring or other tool is indicated at 24 and it is seated in the grooved tool support 15. It is held rigidly in position by tightening the bolt whereby the clamp will be clamped tightly against the tool after the lip 20 thereof has been inserted in the proper notch 21 depending on the size of the tool. In some cases when the tool is of small diameter I interpose a separate metallic V-shaped filling member 25 intermediate the clamp and tool so that the clamp will always retain a horizontal position. The rear end of the tool is preferably held against movement by the end of the shank of the bolt 23 which is screwed against said tool.

After the tool has been clamped in proper position the height thereof may be varied by sliding the plate 10 upwardly or downwardly as the case may be and then clamping said plate against movement in the manner previously described. Irrespective of the position of said plate, the tool will always retain a perfectly horizontal position as is manifest.

What I claim as my invention is:—

1. A tool-holder comprising a post, a plate slidable on said post, means extending horizontally through said post for laterally jamming said plate against a side of said post to prevent movement of said plate and means carried by said plate for holding the tool.

2. A tool-holder comprising a post, a plate slidable on said post and having notches in said plate, a tool support carried by said plate and a clamp for the tool carried by said tool support and having a lip adapted to enter said notches said post providing a supporting structure for the elements of said tool-holder.

3. A tool-holder comprising a post, a plate slidable on said post, a tool support carried by said plate, means for clamping the tool to said tool support, and a separate clamp having a laterally extending arm engaging the tool and wedged against said plate, said post providing a supporting structure for the elements of said tool-holder.

Signed at New York in the county of New York and State of New York this 12th day of March, A. D. 1925.

THOMAS B. TIEFENBACHER.